US011213952B2

United States Patent
Tsuneta et al.

(10) Patent No.: US 11,213,952 B2
(45) Date of Patent: Jan. 4, 2022

(54) ARTICULATED ROBOT AND ARTICULATED ROBOT SYSTEM

(71) Applicant: Nidec Corporation, Kyoto (JP)

(72) Inventors: Haruhiro Tsuneta, Kyoto (JP); Kazuyoshi Yasukawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 83 days.

(21) Appl. No.: 16/606,889

(22) PCT Filed: Apr. 23, 2018

(86) PCT No.: PCT/JP2018/016484
§ 371 (c)(1),
(2) Date: Oct. 21, 2019

(87) PCT Pub. No.: WO2018/199035
PCT Pub. Date: Nov. 1, 2018

(65) Prior Publication Data
US 2020/0055189 A1    Feb. 20, 2020

(30) Foreign Application Priority Data

Apr. 26, 2017  (JP) .............................. JP2017-087201

(51) Int. Cl.
*B25J 9/06* (2006.01)
*B25J 9/16* (2006.01)
*B25J 9/00* (2006.01)

(52) U.S. Cl.
CPC ........... *B25J 9/1666* (2013.01); *B25J 9/0087* (2013.01); *B25J 9/06* (2013.01)

(58) Field of Classification Search
CPC ... B25J 9/06; B25J 9/0087; B25J 17/00; B25J 18/02; B25J 9/042; B25J 9/106;
(Continued)

(56) References Cited

U.S. PATENT DOCUMENTS 5,497,674 A    3/1996  Inada
9,764,480 B2 *  9/2017  Oka ........................ B25J 17/00
(Continued)

FOREIGN PATENT DOCUMENTS

JP    59-187489 A    10/1984
JP    2009-93352 A    4/2009
(Continued)

OTHER PUBLICATIONS

Souissi et al., Design optimisation of parallel joint mechanism for humanoid spine, 2012, IEEE, p. 991-1000 (Year: 2012).*
(Continued)

*Primary Examiner* — Mcdieunel Marc
(74) *Attorney, Agent, or Firm* — Keating & Bennett

(57) ABSTRACT

An articulated robot includes a lumbar portion including a first joint that rotates about a first axis which is a vertical axis and rotating about the first axis, a second joint connected to the lumbar portion and rotating about a second axis parallel to a horizontal plane, a first arm connected to the second joint and rotating about the second axis, a third joint connected to the first arm and rotating about a third axis parallel to the second axis, and a second arm connected to the third joint and rotating about the third axis. When the first arm extends parallel to the first axis, a clearance through which the second arm rotating about the third axis can pass in a planar area between the second axis and the third axis is provided between the second arm and the first arm and between the second arm and the lumbar portion.

15 Claims, 12 Drawing Sheets

(58) Field of Classification Search
CPC . B25J 9/126; B25J 18/04; B25J 9/0084; B25J 17/0283; B25J 9/1666; B25J 9/00; A61B 34/30; A61B 2034/305; A61B 17/7052; A61B 34/00; A61G 13/04; A61G 13/1235; A61G 7/018; Y10T 74/20329; Y10T 74/20305; Y10S 901/15; Y10S 414/13

See application file for complete search history.

(56) References Cited

U.S. PATENT DOCUMENTS

| | | | |
|---|---|---|---|
| 10,737,378 B2 * | 8/2020 | Akaha | B25J 9/0018 |
| 10,960,537 B2 * | 3/2021 | Yoon | B25J 17/00 |
| 2011/0219906 A1 * | 9/2011 | Haniya | B25J 9/06 74/490.03 |
| 2013/0041509 A1 * | 2/2013 | Saito | B25J 9/047 700/261 |
| 2013/0345866 A1 | 12/2013 | Tanaka et al. | |
| 2015/0013492 A1 * | 1/2015 | Oka | B25J 9/06 74/490.05 |
| 2016/0236359 A1 * | 8/2016 | Song | B25J 9/1065 |
| 2018/0169853 A1 | 6/2018 | Niedermeier | |
| 2019/0231447 A1 * | 8/2019 | Ebbitt | A61F 2/46 |

FOREIGN PATENT DOCUMENTS

| | | |
|---|---|---|
| JP | 2017-13215 A | 1/2017 |
| KR | 10-2013-0066689 A | 6/2013 |
| WO | 2010/013549 A1 | 2/2010 |
| WO | 2015/139841 A1 | 9/2015 |

OTHER PUBLICATIONS

Roderick et al., Design of an arm exoskeleton with scapula motion for shoulder rehabilitation, 2005, IEEE, p. 524-531 (Year: 2006).*

Yongfeng et al., Structure Optimization of a Bi-planar Parallel Mechanism for Spine Surgeries, 2015, IEEE, p. 1022-1025 (Year: 2015).*

Malosio et al., Analysis of elbow-joints misalignment in upper-limb exoskeleton, 2011, IEEE, p. 1-6 (Year: 2011).*

Official Communication issued in International Patent Application No. PCT/JP2018/016484, dated Jul. 24, 2018.

* cited by examiner

ROLL JOINT (R)

PITCH JOINT (P)

ARTICULATED ROBOT AND ARTICULATED ROBOT SYSTEM

CROSS REFERENCE TO RELATED APPLICATIONS

This is the U.S. national stage of PCT Application No. PCT/JP2018/016484, filed on Apr. 23, 2018, and priority under 35 U.S.C. § 119(a) and 35 U.S.C. § 365(b) is claimed from Japanese Application No. 2017-087201, filed Apr. 26, 2017; the entire contents of which are hereby incorporated herein by reference.

1. FIELD OF THE INVENTION

The present application relates to an articulated robot and an articulated robot system.

2. BACKGROUND

Japanese Unexamined Patent Application Publication No. 2017-13215 discloses an articulated robot for use in transporting workpieces. This articulated robot is rotatably fixed to a floor and rotates greatly when transporting a workpiece between workbenches.

International Publication No. WO 2010/013549 discloses an articulated robot for transporting substrates. This articulated robot transports plate-like workpieces using an arm that rotates about a horizontal axis.

The articulated robot disclosed in Japanese Unexamined Patent Application Publication No. 2017-13215 requires a wide space for rotation. For this reason, workbenches cannot be closely disposed.

The articulated robot disclosed in International Publication No. WO 2010/013549 does not rotate about a vertical axis but rotates a plate-like workpiece about a horizontal axis. Since this articulated robot cannot rotate about the vertical axis, it can perform only limited motions.

SUMMARY

Example embodiments of the present disclosure provide articulated robots and articulated robot systems each capable of various motions at high speed in a relatively narrow work space. An articulated robot according to an example embodiment of the present disclosure includes a lumbar portion including a first joint that rotates about a first axis which is a vertical axis, a second joint connected to the lumbar portion and rotating about a second axis parallel or substantially parallel to a horizontal plane, a first arm connected to the second joint and rotating about the second axis, a third joint connected to the first arm and rotating about a third axis parallel or substantially parallel to the second axis, and a second arm connected to the third joint and rotating about the third axis. When the first arm extends parallel or substantially parallel to the first axis, a clearance through which the second arm rotating about the third axis can pass in a planar area between the second axis and the third axis is provided between the second arm and the first arm and between the second arm and the lumbar portion.

The above and other elements, features, steps, characteristics and advantages of the present disclosure will become more apparent from the following detailed description of the example embodiments with reference to the attached drawings.

DETAILED DESCRIPTION

Terms

Figure 1:
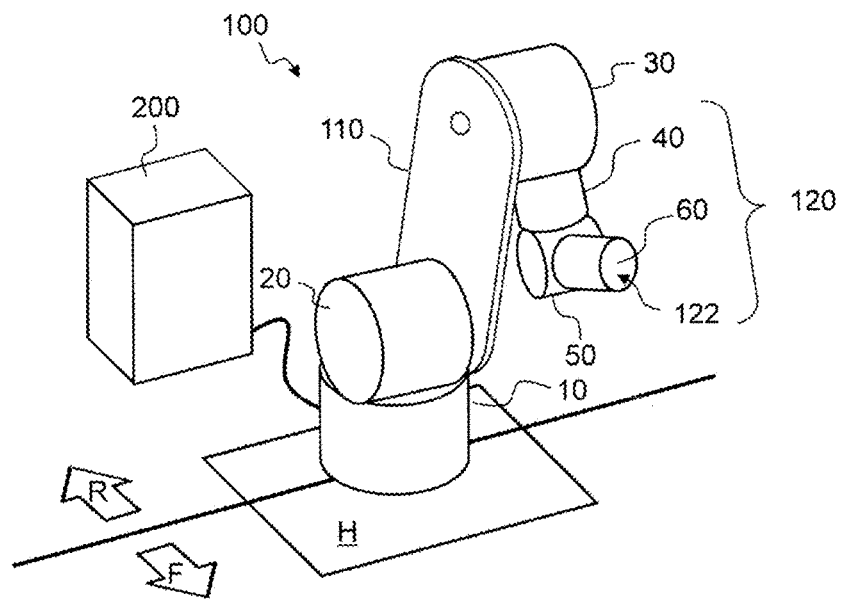
FIG. 1 is a perspective view illustrating a schematic configuration example of an articulated robot system of an example embodiment of the present disclosure.

The terms "vertical axis" and "horizontal plane" indicate orientations defined with reference to the upper surface (installation surface) of a base on which the articulated robot is installed. Specifically, a direction perpendicular to the installation surface is referred to as "vertical axis", and a planar surface orthogonal to "vertical axis" is referred to as "horizontal plane". These terms are used for the purpose of simplification and illustration of the positional relationship between the components of the present disclosure and are not intended to limit the orientation of the articulated robot in use. In the example embodiment of the present disclosure, the vertical axis agrees with the vertical direction, but the term "vertical axis" is not limited to this example. "Vertical axis" may be angled from the vertical direction.

The term "first arm" is used as a term corresponding to "upper arm", and "second arm" is used as a term that can include "both of the forearm and the wrist". The second arm can include a plurality of joints but no end effector.

"End effector" is a device that is attached to the second arm for use so that the articulated robot can perform work. Typical examples of the end effector include a gripper, a nut driver, a welding gun, and a spray gun. The end effector can be interchanged by the user depending on the application of the articulated robot.

"End of the second arm" is the end effector attaching surface of the second arm. The attaching surface is also referred to as "mechanical interface". "End of the second arm" may also be referred to as a tool center point.

"Central axis of the second arm" is the axis of rotation of a joint that rotates about a direction in which the second arm extends. If the number of the joints is two or more, the axis of rotation of a joint (a fourth joint) closet to the root of the second arm (a third joint) is referred to as "the axis of rotation of the second arm". In the example embodiment described below, joints that rotate about the extending direction of the second arm are the fourth joint and a sixth joint. In the example embodiment, if the second arm extends straight, the axis of rotation of the fourth joint and the axis of rotation of the sixth joint are on the same axis (the central axis of the second arm). The fourth joint is sometimes referred to as a second elbow joint depending on its position, but in the present disclosure, the fourth to sixth joints may be collectively referred to as "wrist joints".

"Second arm reference point" is an end of the second arm when the second arm extends straight, or a so-called "wrist reference point (wrist central point". The wrist reference point (wrist central point) is the point of intersection of two or three axes of rotation of two or three wrist joints. In the example embodiment described below, the axes of rotation of the fourth to sixth joints intersect at one point. This intersecting point is the wrist reference point.

<Basic Configuration of Articulated Robot>

The basic configuration of the articulated robot of the present disclosure will be described hereinbelow with reference to the attached drawings. In the attached drawings, the configuration and operation of the articulated robot are given high priority, and the shapes of the components are illustrated in a simplified manner. The shapes of the illustrated components do not limit the specific shapes of the components of the example embodiment at all.

Figure 2:
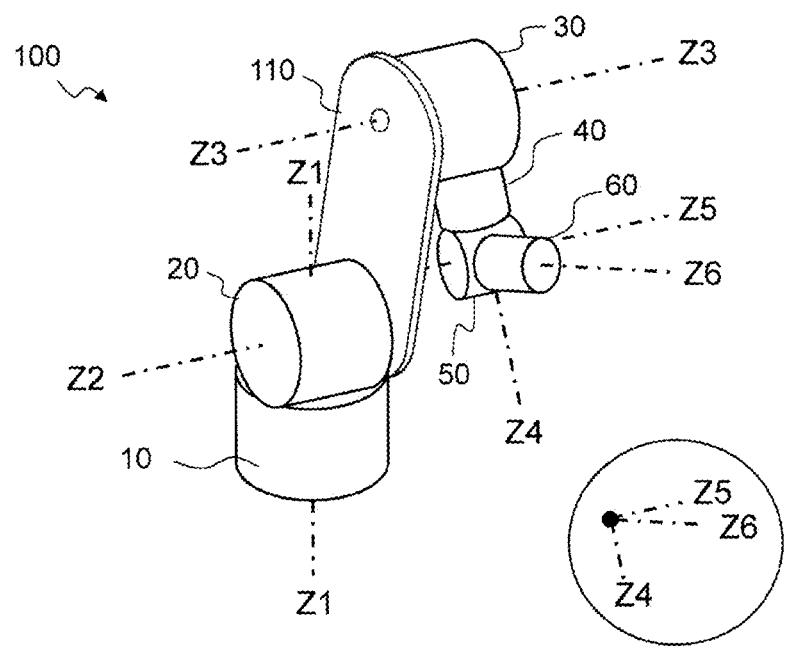
FIG. 2 is a perspective view of the articulated robot 100 according to an example embodiment of the present disclosure illustrating the axes of the joints.

Refer first to FIGS. 1 and 2. As illustrated in these drawings, in an unlimited example embodiment, the articulated robot system of the present disclosure includes an articulated robot 100 and a controller 200 that controls the articulated robot 100. The articulated robot is generally called a robot arm or a manipulator.

The controller 200 is a so-called computer and includes a central processing unit (CPU), a memory, a secondary storage device, and a communication terminal for transmitting and receiving data to and from the articulated robot 100 (not illustrated). The memory stores a computer program. The computer program is a set of instructions that the CPU executes. By executing the computer program of the controller 200, the CPU can rotate the motor of each joint of the articulated robot 100 to control the posture. The operation of the articulated robot 100 described below is performed according to an instruction from the CPU of the controller 200.

The articulated robot 100 includes a lumbar portion 10 that rotates about a first axis Z1 illustrated in FIG. 2. The lumbar portion 10 includes a first joint that rotates about the first axis Z1, which is a vertical axis orthogonal to a horizontal plane H. The first joint is a revolute joint. In the present disclosure, "joint" can include electrical mechanical elements, such as a motor that drives the joint and a reduction gear, and a sensor that detects the angle of rotation (the joint variable) of the joint. For this reason, the term "joint" can be used as a term that means "joint portion" or "joint unit". However, the position of the motor that drives "joint" illustrated is not limited to the interior of the component denoted by the sign that denotes "joint".

The articulated robot 100 includes a second joint 20 connected to the lumbar portion 10 and rotating about a second axis Z2 parallel to the horizontal plane, a first arm 110 connected to the second joint 20 and rotating about the second axis Z2, a third joint 30 connected to the first arm 110 and rotating about a third axis Z3 parallel to the second axis Z2, and a second arm 120 connected to the third joint 30 and rotating about the third axis Z3.

In the example embodiment of the present disclosure, The second arm 120 further includes a fourth joint 40 that rotates about a fourth axis Z4 orthogonal to the third axis Z3, a fifth joint 50 that rotates about a fifth axis Z5 orthogonal to the fourth axis Z4, and a sixth joint 60 that rotates about a sixth axis Z6 orthogonal to the fifth axis Z5. An end effector is attached to an end 122 of the second arm 120.

FIG. 1 illustrates arrow F that indicates the "front side" of the articulated robot 100 and arrow R that indicates the "rear side" of the articulated robot 100. In the example of FIG. 1, the "front side" and the "rear side" of the articulated robot 100 are partitioned by a plane (a reference vertical plane) in a plane (a vertical plane) including the first axis Z1 parallel to the second axis Z2. The reference vertical plane rotates about the first axis Z1 with the rotation of the lumbar portion 10.

As described below, the articulated robot 100 in the example embodiment of the present disclosure is configured to move (pass-through) the end of the second arm from "front side" to "rear side", or from "rear side" to "front side" of the articulated robot 100. As described above, the articulated robot 100 illustrated in FIGS. 1 and 2 has a configuration in which the specific configuration of the example embodiment (for example, the configuration illustrated in FIGS. 12A and 12B) is extremely simplified.

Figure 14:
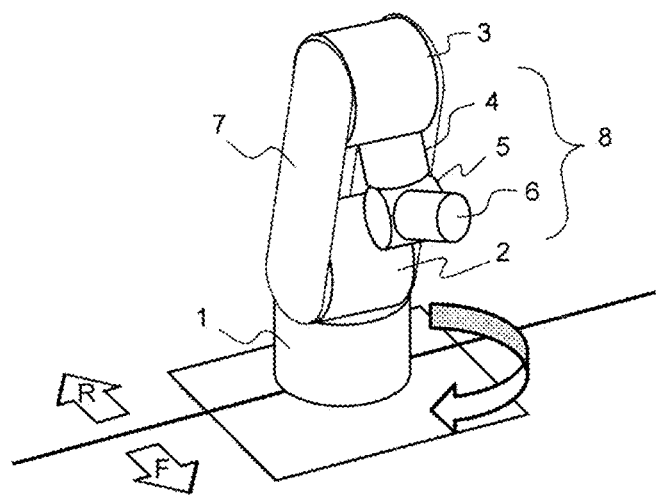
FIG. 14 is a perspective view of a conventional articulated robot illustrating a configuration example.

An example configuration of a conventional articulated robot compared with the articulated robot 100 of the present example embodiment is illustrated in FIG. 14. The articulated robot in FIG. 14 includes a lumbar portion 1, a second joint 2 connected to the lumbar portion 1 and rotating parallel to the horizontal plane, a first arm 7 connected to the second joint 2 and rotating about the axis of the second joint 2, a third joint 3 connected to the first arm 7 and rotating about an axis parallel to the axis of the second joint 2, and a second arm 8 connected to the third joint 3 and rotating about an axis orthogonal to the axis of the third joint 3. The second arm 8 further includes a fourth joint 4 that rotates about the axis orthogonal to the axis of the third joint 3, a fifth joint 5 rotating about an axis orthogonal to the axis of the fourth joint 4, and a sixth joint 6 rotating about an axis orthogonal to the axis of the fifth joint 5. The length from the third joint 3 through the fourth joint 4 to an end of the fifth joint 5 as viewed along the axis of the fourth joint 4 is larger than the distance from the third joint 3 to an upper end of the second joint 2. If the second arm 8 moves from "front side" to "rear side" or from "rear side" to "front side" at a position lower than the third joint 3, the second arm 8 strikes against the second joint 2.

Such a conventional articulated robot requires a motion of rotating the second arm 8 upward greatly about the axis of rotation of the third joint 3 to extend the first arm 7 and the second arm 8 straight in order to move the end of the second arm 8 from the "front side" to the "rear side", or from the "rear side" to the "front side" of the articulated robot. To execute such a motion, a wide space is needed above the articulated robot.

Figure 3:
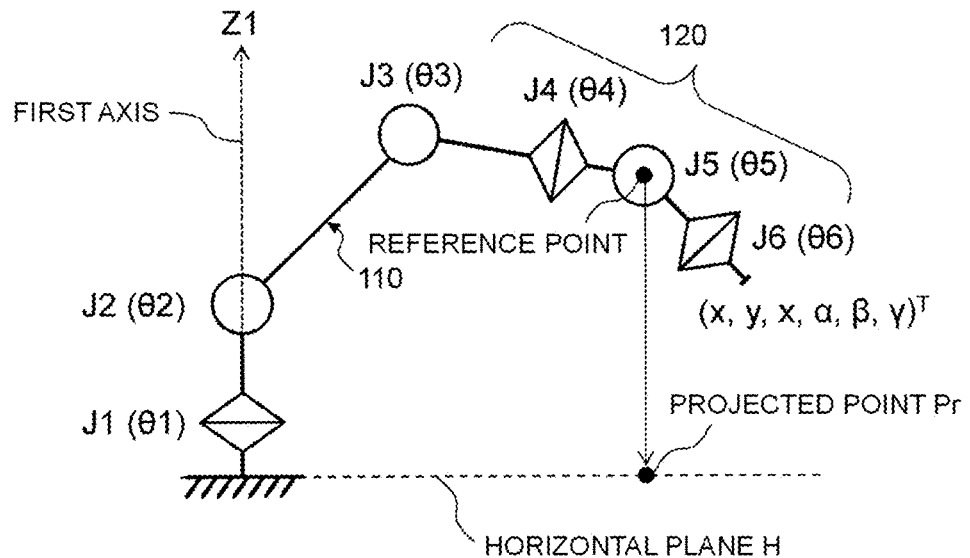
FIG. 3 illustrates the relationship among the joints of the articulated robot 100 of the present example embodiment.
Figure 4:
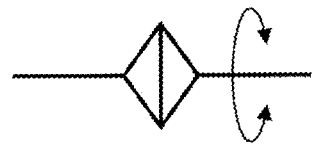
FIG. 4 is a diagram illustrating the symbol of a roll joint.
Figure 5:
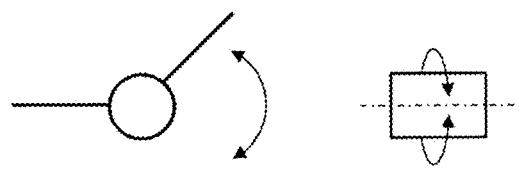
FIG. 5 is a diagram illustrating the symbol of a pitch joint.

FIG. 3 shows the relationship among the joints of the articulated robot 100 of the present example embodiment. The symbols illustrated in FIG. 3 include the two kinds of joint illustrated in FIGS. 4 and 5. FIGS. 4 and 5 schematically illustrate different directions of the rotational motion. The joint in FIG. 4 is a kind of rotary joint and is called a roll joint or a torsional joint. The joint in FIG. 5 is a kind of rotary joint and is called a pitch joint or a pivot joint. An articulated robot in which six rotary joints are connected in series is generally referred to as "six-axis vertical articulated robot".

FIG. 3 illustrates a joint J1 fixed to a base having an upper surface parallel to the horizontal plane H and joints J2, J3, J4, J5, and J6 connected in series to the joint J1. In this example, the joints J1, J4, and J6 are roll joints, and the joints J2, J3, J5 are pitch joints. Although all of the links that connect adjacent two joints are straight lines, the shape of the rigid parts corresponding to the links are not limited to the straight lines. The six joints J1 to J6 correspond to the first to sixth joints described above. The angle of rotation, that is, the joint variable, of a k-th joint Jk (k=1, 2, . . . , 6) counted from the base, is $\theta k$. Six joint variables $\theta k$ (k=1, 2, . . . , 6) define the coordinates in the joint space. In contrast, the coordinates in the work space are defined by the coordinates $(x, y, z, \alpha, \beta, \gamma)^T$ of the position and posture of the end of the second arm 120. Here, the superscript "T" is a sign that means transposition of the vector or matrix.

The "reference point" in FIG. 3 indicates a second arm reference point. The reference point coincides with the wrist reference point. A point Pr obtained by projecting the second arm reference point perpendicularly to the horizontal plane H is referred to as "projected point of the second arm reference point" or "projected point". Even if the joint variable $\theta 5$ of the joint J5 changes from the state in FIG. 3, the position of the second arm reference point does not change, so that also the position of the projected point Pr in the horizontal plane H does not change. This applies to a case in which the joint variable $\theta 4$ or $\theta 6$ of the joint J4 or J6 changes. However, if the joint variable $\theta 1$ of the joint J1 changes, the position of the second arm reference point and the position of the projected point Pr in the horizontal plane H rotate about the first axis Z1 (the vertical axis). Thus, the positions of the second arm reference point and the projected point Pr depend on the joint variables $\theta 1$, $\theta 2$, and $\theta 3$, but do not depend on the joint variables $\theta 4$, $\theta 5$, and $\theta 6$.

Refer again to FIG. 2. As illustrated in FIG. 2, the fourth axis Z4, the fifth axis Z5, and the sixth axis Z6 in the present example embodiment intersect each other at one point. The fourth joint 40, the fifth joint 50, and the sixth joint 60 illustrated in FIGS. 1 and 2 form an Euler wrist. The wrist may be of a three roll type constituted by only roll joints or of another type.

Figure 6:
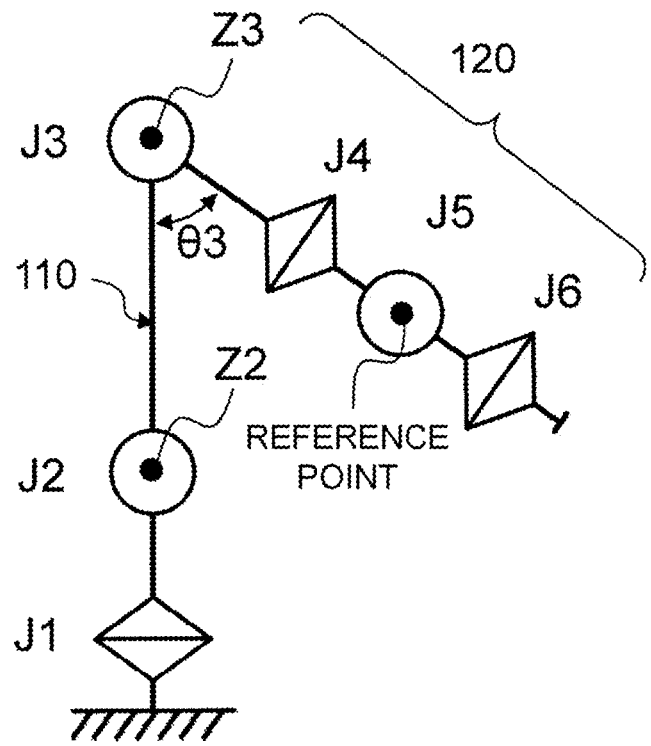
FIG. 6 is a diagram in which a plane perpendicular or substantially perpendicular to the axes of rotation (a second axis Z2 and a third axis Z3) of joints J2 and J3 in planes including the vertical axis coincides with the plane of the drawing.
Figure 7:
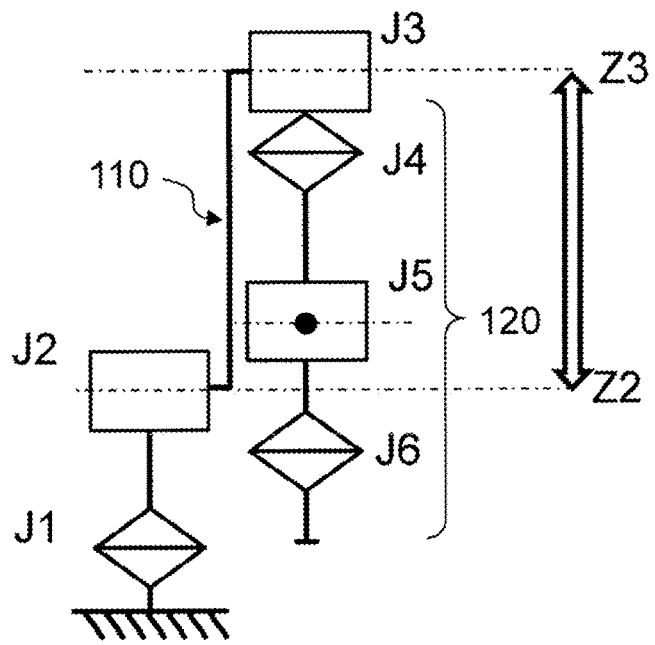
FIG. 7 is a diagram in which a plane including the vertical axis and the axes of rotation (the second axis Z2 and the third axis Z3) of the joints J2 and J3 coincide with the plane of the drawing.

Refer next to FIGS. 6 and 7. FIG. 6 is a diagram in which a plane perpendicular to the axes of rotation (the second axis Z2 and the third axis Z3) of the joints J2 and J3 in planes including the vertical axis coincides with the plane of the drawing. FIG. 7 is a diagram in which a plane including the vertical axis and the axes of rotation (the second axis Z2 and the third axis Z3) of the joints J2 and J3 coincide with the plane of the drawing. Comparison between the state in FIG. 6 and the state in FIG. 7 shows that there is a difference in the value $\theta 3$ of the joint variable of the joint J3, but there is no difference between the joint variables of the other joints J1, J2, and J4 to J6. In both states in FIGS. 6 and 7, the first arm extends in a direction parallel to the vertical axis. Although the second arm 120 extends in a different direction, the second arm 120 itself extends straight.

In the present disclosure, the state in FIG. 7 is defined as the reference state of the articulated robot. The values of the joint variables of the six joints J1 to J6 are 0 radians. The state in FIG. 6 is achieved by increasing or decreasing only the joint variable $\theta 3$ of the joint J3 from the state in FIG. 7.

Figure 8:
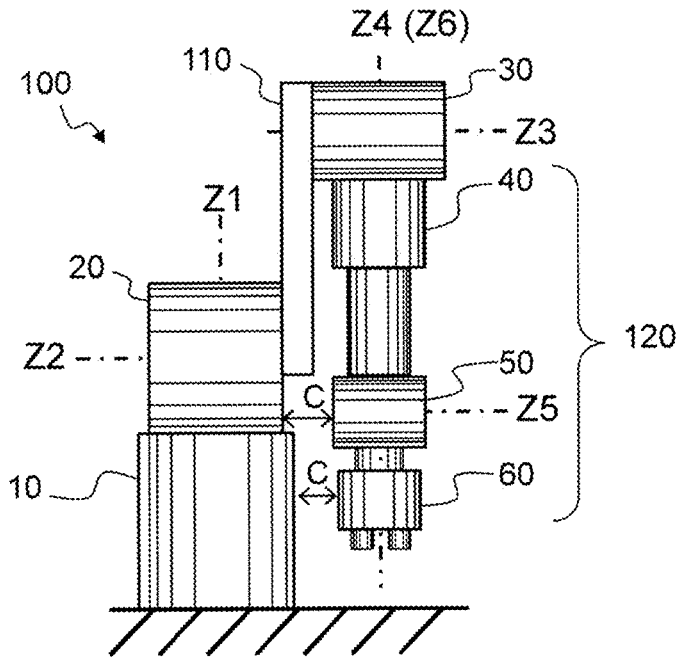
FIG. 8 is a front view of the articulated robot 100 in the state illustrated in FIG. 7 schematically illustrating an example configuration according to the present disclosure.

FIG. 8 is a front view of the articulated robot 100 in the state illustrated in FIG. 7 schematically illustrating an example configuration. In the articulated robot 100, when the first arm 110 extends parallel to the first axis Z1, a clearance through which the second arm 120 rotating about the third axis Z3 can pass in a planar area between the second axis Z2 and the third axis Z3 is provided between the second arm 120 and the first arm 110 and between the second arm 120 and the lumbar portion 10. This clearance is schematically indicated by arrows C in FIG. 8.

The clearance may not always be ensured for the values of the joint variable $\theta 4$ of the fourth joint 40 and the joint variable $\theta 5$ of the fifth joint 50. Suppose a state in which the joint variable $\theta 4$ of the fourth joint 40 changes from the state in FIG. 8, so that the axis of rotation (the fifth axis Z5) of the fifth joint 50 becomes perpendicular to the second axis Z2 and the third axis Z3. If the joint variable $\theta 5$ of the fifth joint 50 changes from the state in FIG. 8 in this state, part of the second arm 120 can interfere with the lumbar portion 10 and so on. For this reason, the clearance may be obtained at least when the respective joint variables $\theta 4$ and $\theta 5$ of the fourth joint 40 and the fifth joint 50 are within a limited range. Typically, the clearance is required when the second arm 120 extends straight, for example, in the reference state of the articulated robot.

In the configuration example illustrated in FIGS. 7 and 8, when the central axis of the second arm 120 (which coincides with the fourth axis Z4) is parallel to the vertical axis (the first axis Z1), the central axis is offset in the horizontal direction from the vertical axis (the first axis Z1). The presence of such an offset can increase the moving speed of the end of the second arm 120 using the rotation of the lumbar portion 10. Let $\omega 1$ be the rotation speed of the first joint of the lumbar portion 10, $\omega 3$ be the rotation speed of the third joint 30, L3 be the distance from the third axis Z3 to the wrist reference point, and $L_{off}$ be the amount of offset. $L_{off}$ is the distance from the first axis Z1 to the central axis (the fourth axis Z4) of the second arm 120. The moving speed of the wrist reference point when the second arm 120 extended straight is rotated is expressed as $\omega 3 \cdot L3 + \omega 1 \cdot L_{off}$. The presence of $L_{off}$, which is not zero, allows the rotation of the lumbar portion 10 to increase the moving speed of the wrist reference point.

Figure 9:
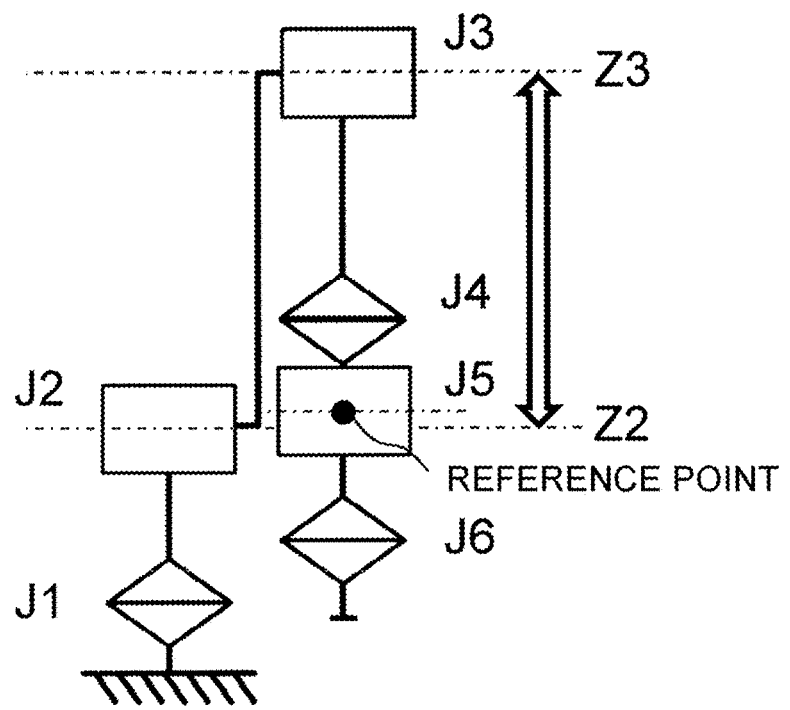
FIG. 9 is a schematic diagram illustrating another example configuration of the articulated robot 100.
Figure 10:
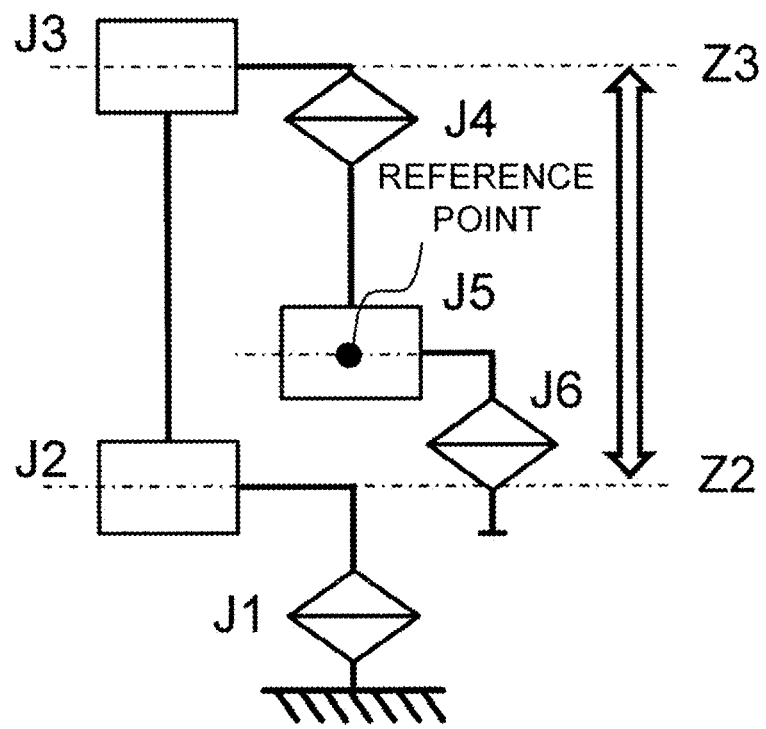
FIG. 10 is a schematic diagram illustrating still another example configuration of the articulated robot 100.

FIGS. 9 and 10 are schematic diagrams illustrating another configuration example.

In the example of FIG. 9, the position of the joint J4 is away from the joint J3 and is close to the joint J5. The joint J4 may be at any position on the central axis of the second arm between the joint J3 and the joint J5. When the joint J4 is close to the joint J3, it can be said that the joint J4 forms an elbow with two degrees of freedom together with the joint J3. If the joint J4 is close to the joint J5, it can be said that the joint J4 forms a wrist with three degrees of freedom together with the joint J5 and the joint J6.

In the example of FIG. 10, the axis of rotation of the joint J4 (the fourth axis Z4) coincides with the axis of rotation of the joint J1 (the first axis Z1). In other words, when the central axis of the second arm 120 is parallel to the vertical axis, the central axis is not offset in the horizontal direction from the vertical axis. Thus, the second arm reference point and the projected point Pr are located on the axis of rotation (the first axis Z1) of the joint J1.

Figure 11:
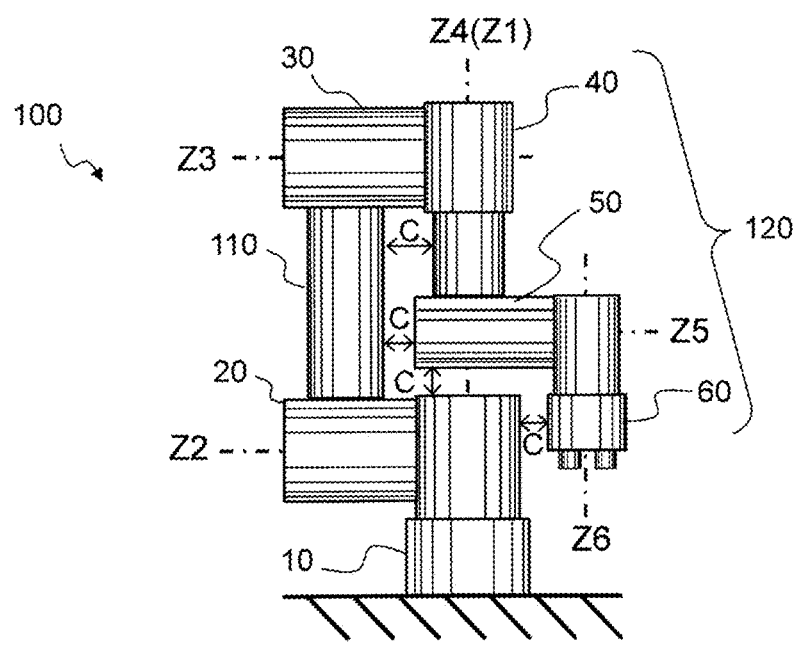
FIG. 11 is a front view of the articulated robot 100 in the state illustrated in FIG. 10 schematically illustrating an example configuration.

FIG. 11 is a front view of the articulated robot 100 in the state illustrated in FIG. 10 schematically illustrating a configuration example. Also in the articulated robot 100, when the first arm 110 extends parallel to the first axis Z1, a clearance through which the second arm 120 rotating about the third axis Z3 can pass in a planar area between the second axis Z2 and the third axis Z3 is provided between the second arm 120 and the first arm 110 and between the second arm 120 and the lumbar portion 10. This clearance is schematically indicated by arrows C in FIG. 11.

In either of the above examples, the lumbar portion 10 is located below the second axis Z2. For this reason, it is important to ensure a clearance from the lumbar portion 10 for the motion of the second arm 120.

Figure 12A:
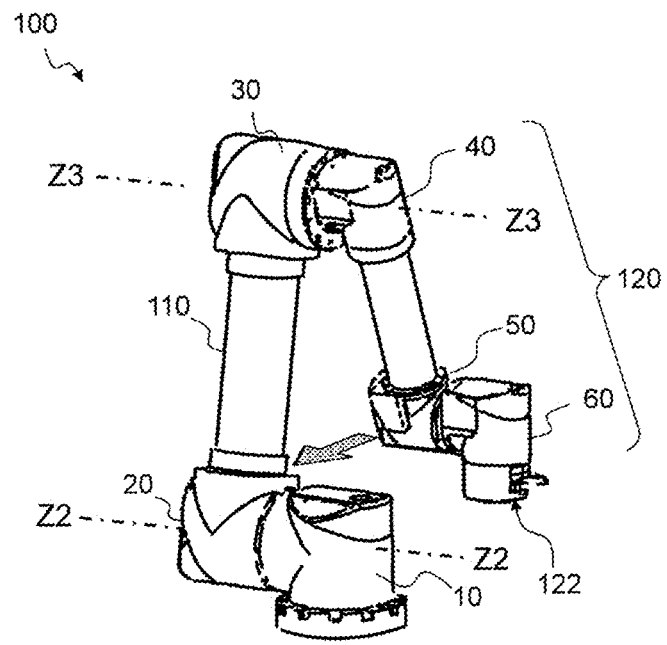
FIG. 12A is a perspective view illustrating, in the articulated robot of an example embodiment of the present disclosure, the posture of a second arm immediately before the second arm rotating about the third axis Z3 passes through a planar area between the second axis Z2 and the third axis Z3.
Figure 12B:
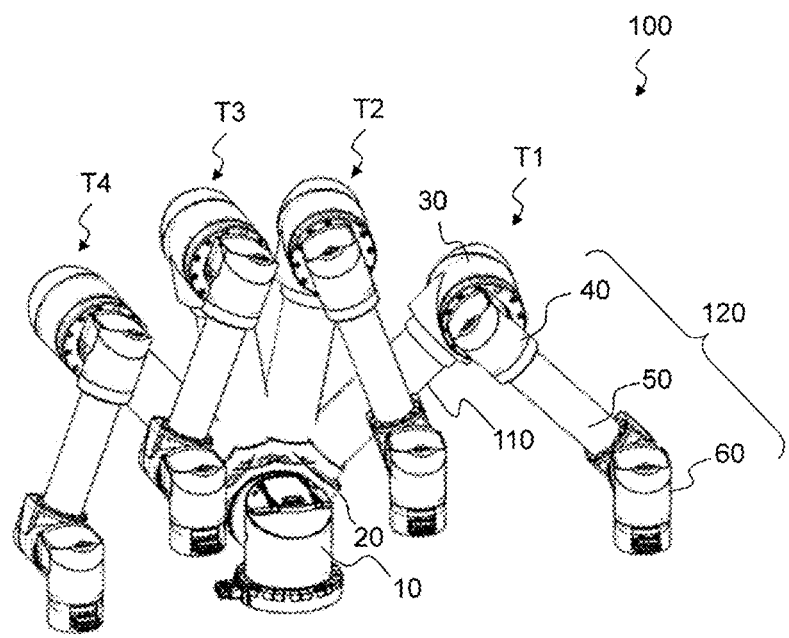
FIG. 12B is a perspective view of four postures of an articulated robot of an example embodiment of the present disclosure that can take at different four timings illustrated at the same time.

FIG. 12A is a perspective view illustrating the posture of the second arm 120 immediately before the second arm 120 rotating about the third axis Z3 passes through the planar area between the second axis Z2 and the third axis Z3. FIG. 12B is a perspective view of four postures of the articulated robot 100 that can take at different four timings T1, T2, T3, and T4 illustrated at the same time. In the illustrated example, the posture of the articulated robot 100 changes from timing T1 toward T4. At that time, the end of the second arm 120 passes in the vicinity of the lumbar portion 10.

The controller 200 can set predetermined angles to the joint variables θ4 and θ5 to ensure a clearance. The "predetermined angles" are the angles of the fourth joint 40 and the fifth joint 50 at which the above clearance can be ensured. The motors of the fourth joint 40 and the fifth joint 50 rotate so that the fourth joint 40 and the fifth joint 50 come to the angles specified by the joint variables θ4 and θ5, respectively. Thus, the motors of the fourth joint 40 and the fifth joint 50 rotate to ensure the above clearance.

The time to start the rotation of each motor can be determined based on a predetermined "specified time". "Specified time T4" of the motor of the fourth joint 40 is a specified time required to match the angle of the fourth joint 40 to the joint variable θ4. "Specified time T5" of the motor of the fifth joint 50 is a specified time required to match the angle of the fifth joint 50 to the joint variable θ5.

In this specification, the posture of the articulated robot 100 when the second arm 120 rotating about the third axis Z3 passes through the planar area between the second axis Z2 and the third axis Z3 is referred to as "arm peculiar posture" or simply "peculiar posture". When the articulated robot 100 takes the peculiar posture, the first arm 110 and the second arm 120 go to a folded state. In the present disclosure, the joint variable θ3 of the third joint 30 (the rotation angle of the third axis Z3) when the articulated robot 100 is at the peculiar posture is 0 degrees. It is only required that there is a clearance between the second arm 120 and lumbar portion 10 when the articulated robot 100 takes the peculiar posture.

The angle of the second joint 20 or the angle of the first arm 110 with respect to the horizontal plane H has no influence on the peculiar posture of the articulated robot 100. When the articulated robot 100 takes the peculiar posture, the first arm 110 may or may not be parallel to the first axis Z1. The first arm 110 may or may not move before and after the articulated robot 100 takes the peculiar posture. Even if the first arm 110 keeps inclined with respect to the horizontal plane H, the articulated robot 100 can take the peculiar posture by moving the second arm 120.

The controller 200 starts to rotate the motor of the fourth joint 40 from the time before time T4 or more counting from the time T at which the articulated robot 100 takes the peculiar posture and starts to rotate the motor of the fifth joint 50 from the time before time T5 or more counting from the time T. This allows the above clearance to be ensured by the time the articulated robot 100 takes the above peculiar posture at the latest, in other words, by the time the second arm 120 passes through the planar area 12.

Figure 13:
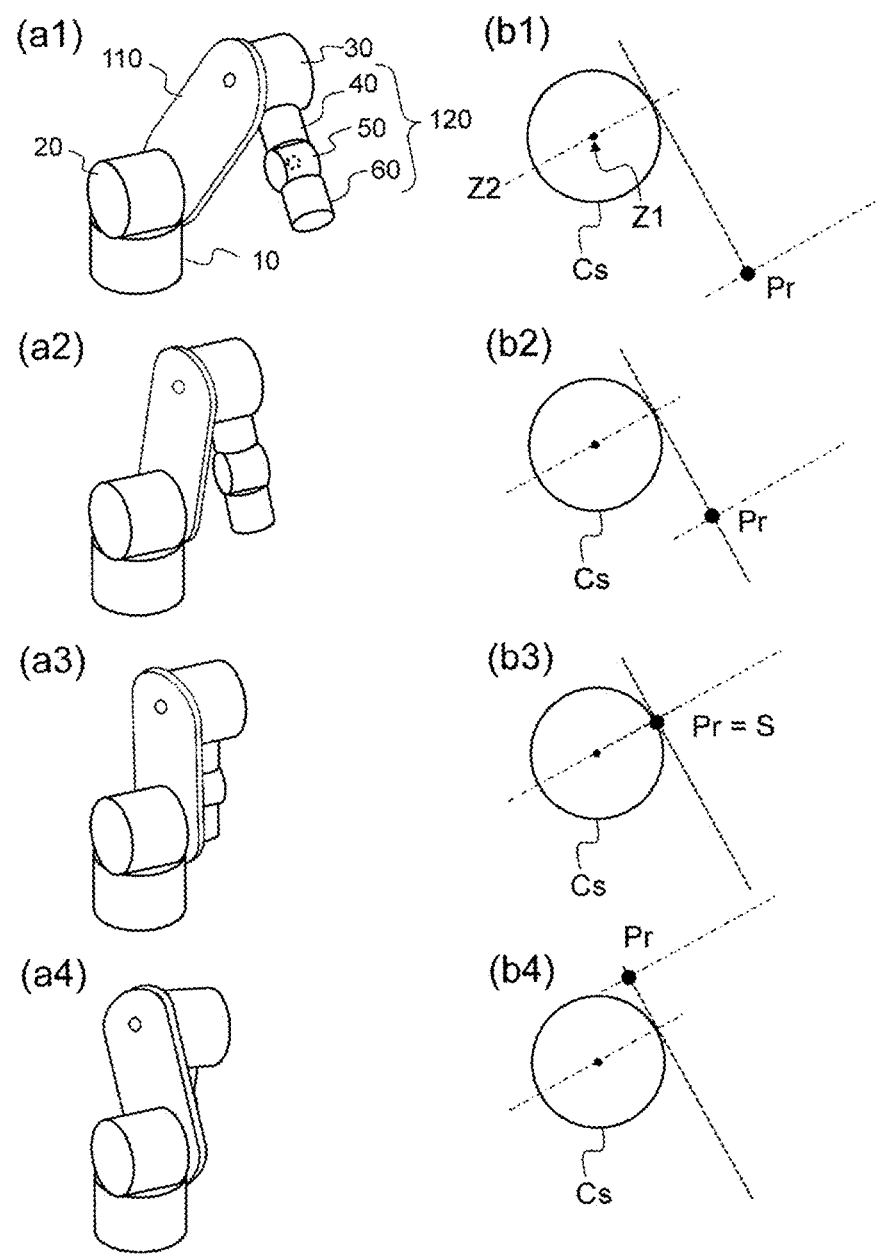
FIG. 13 is a diagram illustrating an example of the locus of the projected point Pr of a second arm reference point with the motion of the second arm 120.

Referring to FIG. 13, an example of the locus of the projected point Pr of the second arm reference point with the motion of the second arm 120 will be described. First, an example of the motion of the articulated robot 100 with the configuration illustrated in FIGS. 1 and 2 when the lumbar portion 10 does not rotate will be described. FIGS. 13(a1) to (a4) are schematic perspective views of the articulated robot 100 illustrating its posture, and FIGS. 13(b1) to (b4) are diagrams illustrating the locus of the projected point Pr on a horizontal plane. The horizontal plane is a plane including the second axis Z2 and perpendicular to the first axis Z1. A circle Cs illustrated in FIGS. 13(b1) to (b4) is a locus that the projected point of the second arm reference point when the first arm 110 is parallel to the first axis Z1, and the first arm 110 and the second arm 120 are at the peculiar posture forms with the rotation of the lumbar portion 10. In the present disclosure, the circle Cs is sometimes referred to as "the locus circle of a peculiar point".

In the state illustrated in FIGS. 13(a1) and (b1), the point (projected point) Pr, which is the reference point of the second arm 120 projected on the horizontal plane, is at a position away from the first axis Z1.

In the state illustrated in FIGS. 13(a2) and (b2), the projected point Pr approaches the first axis Z1 as the second arm 120 rotates about the third axis Z3.

In the state illustrated in FIGS. 13(a3) and (b3), the first arm 110 and the second arm 120 take the peculiar posture. At that time, the projected point Pr is on the locus circle Cs of the peculiar point and is closest to the first axis Z1.

In the state illustrated in FIGS. 13(a4) and (b4), the projected point Pr comes away from the first axis Z1.

In the example of FIG. 13, the projected point Pr of the wrist reference point forms a linear locus because the lumbar portion 10 does not rotate. This locus is a tangent to the locus circle Cs of the peculiar point. The position of the point of contact between the locus of the projected point Pr and the circle Cs depends on the joint variable ($\theta 1$) of the first joint J1 of the lumbar portion 10.

When gripping an object with the end effector for transportation, the articulated robot 100 of the present disclosure needs a more complicated motion than the motion illustrated in FIG. 13. Such a complicated motion can include rotation of the lumbar portion 10. However, a feature of the articulated robot 100 of the present disclosure is that a motion of taking the peculiar posture illustrated in FIG. 13(a3) is possible also when the lumbar portion 10 rotates.

As described above, the conventional articulated robot illustrated in FIG. 14 does not has the clearance described above. Such an articulated robot cannot perform the motion illustrated in FIG. 13.

In general, positively taking the peculiar posture has been avoided in controlling the posture of the articulated robot. This is because, when the articulated robot approaches the peculiar posture or takes the peculiar posture, the articulated robot can move very much or stop due to an error even if the movement of the end effector is small.

When the user teaches a moving path of the end effector in a three-dimensional space, the controller calculates a change in the angle of each joint from a minute change of the moving path to set joint variables. Such a motion mode of the articulated robot can also be referred to as a control mode according to "inverse kinematics". Calculating a change in angle in the control mode according to inverse kinematics requires finding the inverse of the Jacobian matrix, described below. Since the Jacobian determinant approaches 0 with a decreasing distance to the peculiar posture, the element of the inverse matrix becomes very large, and as a result, the angle change can sharply increase. Furthermore, since no inverse matrix can be found at the peculiar posture, the controller cannot set a joint variable, possibly causing an error stop.

The inventor has found a control method for operating an articulated robot smoothly and quickly while allowing the articulated robot to take the peculiar posture.

Figure 15:
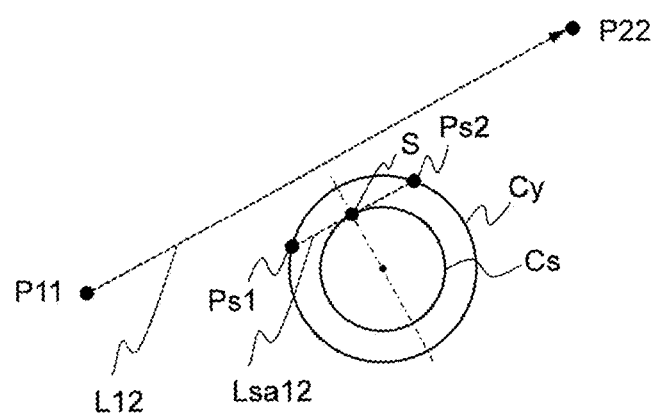
FIG. 15 is a plan view illustrating a projected line segment L12 connecting a projected point P11 of the initial position and a projected point P22 of the end position and a second projected line segment Lsa12 determined by the projected line segment L12.
Figure 16:
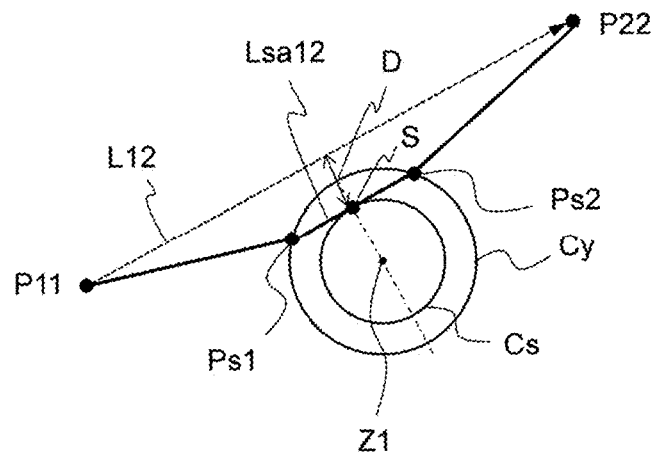
FIG. 16 is a plan view illustrating an example of the horizontal plane projection path (a solid line) of the second arm reference point in an articulated robot of an example embodiment of the present disclosure.
Figure 17:
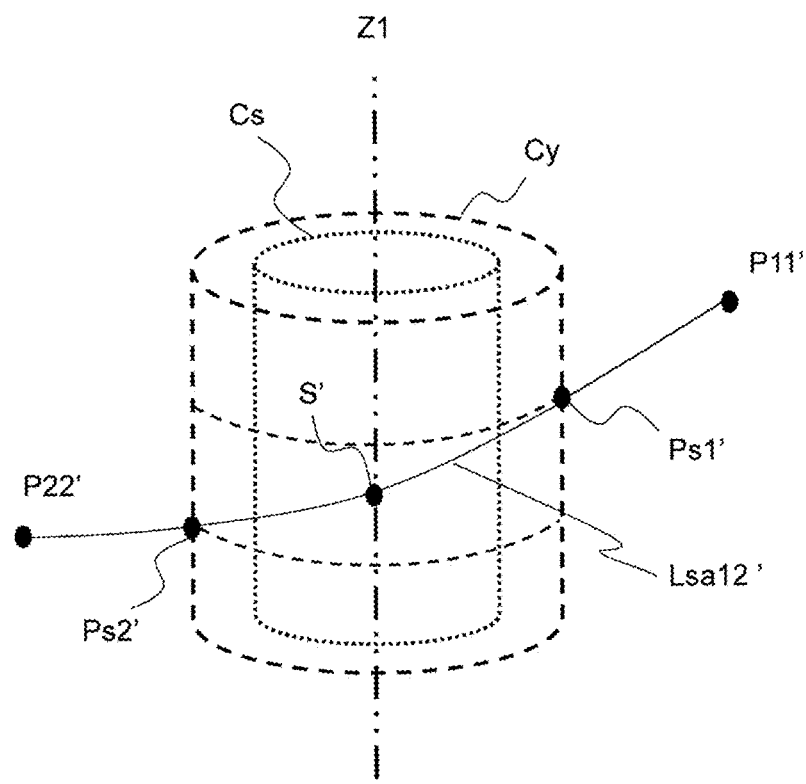
FIG. 17 is a diagram illustrating the horizontal plane projection path illustrated in FIG. 16 in solid in a three-dimensional manner.
Figure 18:
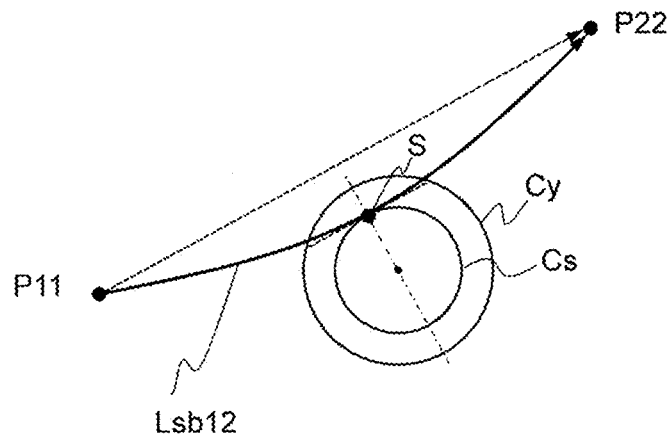
FIG. 18 is a plan view illustrating another example of the horizontal plane projection path (a solid line) of the second arm reference point in an articulated robot of an example embodiment of the present disclosure.

Referring to FIGS. 15 to 18, an example operation in which the first arm 110 and the second arm 120 take the peculiar posture during the rotating motion of the lumbar portion 10 will be described. FIGS. 15, 16, and 18 illustrate points or the loci of the points on a horizontal plane when points at various positions in a three-dimensional space (a working space) are projected perpendicularly to the horizontal plane. The locus circle Cs is the locus of the peculiar point when the first arm 110 is parallel to the first axis Z1, as described above. In the present disclosure, a point obtained by projecting a point in the three-dimensional space perpendicularly to the horizontal plane is referred to as "projected point". A line segment obtained by projecting a line segment connecting two points in the three-dimensional space 14 perpendicularly to the horizontal plane is referred to as "projected line segment". The "projected line segment" sometimes refers to a line segment connecting two projected points on the horizontal plane.

FIGS. 15, 16, and 18 illustrate projected points P11 and P22. The projected points P11 and P22 are projected points at an initial position at which the movement of the articulated robot 100 is started and an end position at which the movement ends, respectively. The "initial position" and "end position" are typically a position at which a workpiece is gripped and a position at which the workpiece is placed, respectively, which can depend on, for example, the disposition of a work line in which the articulated robot 100 is installed. The coordinates of the "initial position" and "end position" may be determined by the controller 200 from image data acquired by a camera attached to the vicinity of the end effector of the articulated robot 100. In this specification, the initial position is sometimes referred to as "first position", and the end position is sometimes referred to as "second position".

A circle Cy outside the locus circle Cs of the peculiar point indicates the boundary of an in-position area defined inside the circle Cy. The "in-position area" refers to an area where the projected point Pr of the second arm reference point can be regarded as having reached the vicinity of the locus circle Cs. The range (size) of the in-position area can be set to any range. The circle Cy has no particular relation to positions where the motors of the fourth joint 40 and the fifth joint 50 start to rotate to ensure the clearance described above.

FIG. 15 illustrates a projected line segment L12 connecting the projected point P11 of the initial position and the projected point P22 of the end position and a second projected line segment Lsa12 determined by the projected line segment L12. The projected line segment Lsa12 is a chord stretched between intersection points Ps1 and Ps2 of the projected line segment L12 and the circle Cy when the projected line segment L12 is translated to a position (a point of contact) S at which the projected line segment L12 comes into contact with the locus circle Cs of the peculiar point.

In the present disclosure, the controller 200 controls the joint variables $\theta 1$, $\theta 2$, and $\theta 3$ so that the path (horizontal plane projection path) of the projected point Pr of the second arm reference point passes through the points Ps1 and Ps2. This will be described below more specifically.

FIG. 16 illustrates the horizontal plane projection path (a solid line) of the second arm reference point. FIG. 17 illustrates the horizontal plane projection path illustrated in FIG. 16 in solid in a three-dimensional manner. The horizontal plane projected point of a point P11' in FIG. 17 is the point P11 illustrated in FIG. 16. Similarly, the horizontal plane projected points of points P22', Ps1', Ps2', and S' in FIG. 17 are points P22, Ps1, Ps2, and S illustrated in FIG. 16, respectively. A line segment obtained by projecting a line segment or a curved line Lsa12' having the points Ps1' and Ps2' at both ends in FIG. 17 to the horizontal plane is the projected line segment Lsa12 illustrated in FIG. 16. The projected line segment Lsa12 in FIG. 16 passes through the contact point S. Likewise, also in FIG. 17, the line segment or the curved line Lsa12' passes through the contact point S'.

The controller 200 chooses an inverse kinematics calculation or a forward kinematics calculation, described below, depending on whether the position of the projected point Pr of the second arm reference point is outside or inside of the "in-position area" on the horizontal plane projection path to drive the articulated robot 100. More specifically, when the projected point Pr of the second arm reference point is to be moved outside the in-position area, the controller 200 performs the inverse kinematics calculation from the coordinates in the working space to calculates the values of the joint variables of the first joint of the lumbar portion 10, the second joint 20, and the third joint 30. At that time, the controller 200 also sets the posture of the end effector and calculates the values of the joint variables of the fourth joint 40, the fifth joint 50, and the sixth joint. However, the values of the joint variables of the fourth joint 40, the fifth joint 50, and the sixth joint do not influence the position of the second arm reference point in the present example embodiment. For this reason, the motions of the fourth joint 40, the fifth joint 50, and the sixth joint 60 are not mentioned for simplification.

The controller 200 controls the motion of the second arm reference point by rotating the motors of the joints so that the first joint of the lumbar portion 10, the second joint 20, and the third joint 30 rotate through angles corresponding to the values of the calculated joint variables.

When moving the projected point Pr of the second arm reference point inside the in-position area, the controller 200 changes the values of the joint variables of the second joint 20 and the third joint 30 in sequence. The term "in sequence" refers to giving a control command value to a motor drive circuit every one millisecond, for example. The motors can typically be controlled by servo operation. The position and posture of the second arm reference point in the working space can be calculated from the values of the joint variables by the forward kinematics calculation.

The controller 200 controls the motion of the second arm reference point by rotating the motors of the joints so that the second joint 20 and the third joint 30 rotate through angles corresponding to the values of the changed joint variables. When the projected point Pr of the second arm reference point reaches the position of the contact point S, the first arm 110 and the second arm 120 become parallel to the axis Z1 of the lumbar portion 10, and the articulated robot 100 takes the peculiar posture. In this example, the first joint of the lumbar portion 10 may not rotate inside the in-position area. In other words, the controller 200 fixes the value of the joint variable of the first joint of the lumbar portion 10 inside the in-position area. The projected point Pr of the second arm reference point moves linearly from the point Ps1 to the point Ps2.

The operation of moving the projected point Pr of the second arm reference point from the position Ps1 to Ps2 by changing the values of the joint variables of the second joint 20 and the third joint 30 in sequence (hereinafter referred to as "an operation according to the example embodiment of the present disclosure") has the following advantageous effects.

First, the operation according to the example embodiment of the present disclosure allows the second arm reference point to move at high speed. The second arm reference point moves at speed V in which speed V2 due to the rotation of the second joint 20 and speed V3 due to the rotation of the third joint 30 are combined. Both of the second joint 20 and the third joint 30 rotate in a direction from the position Ps1 to the position Ps2. Thus, the signs of speeds V2 and V3 are the same. Furthermore, the projected point Pr of the second arm reference point moves linearly along the projected line segment Lsa12. For this reason, if the speed V is projected to the horizontal plane, only a speed component in the moving direction is shown. Thus, the second arm reference point can move at high speed.

For comparison, suppose the moving speed of the second arm reference point due to the operation of rotating the lumbar portion 10. The "operation of rotating the lumbar portion 10" is an operation in which the projected point Pr of the second arm reference point moves on a horizontal plane on the opposite side of a projected line segment L12 connecting the projected point P11 and the projected point P22 from the axis Z1 of the lumbar portion 10 while drawing a large arc.

The first joint of the lumbar portion 10 needs to support the entire weight of the first arm 110, the second arm 120, and the end effector and to rotate them integrally. For this purpose, the first joint includes a motor for generating a torque larger than the torques for the other joints, as well as a reduction mechanism. The presence of the reduction mechanism with emphasis on the torque suppresses the speed of the rotation (the rotation speed) of the first joint, so that the moving speed of the second arm reference point is relatively high. Thus, the operation according to the example embodiment of the present disclosure allows the second arm reference point to move at higher speed than the operation of rotating the lumbar portion 10. Furthermore, since the operation according to the example embodiment of the present disclosure can be achieved only by changing the values of the joint variables of the second joint 20 and the third joint 30 in sequence, the processing load of the controller 200 is very light.

Furthermore, when the articulated robot 100 operates at the peculiar posture, the first arm 110 and the second arm 120 are folded, so that the moments of inertia of the first arm 110 and the second arm 120 are smallest. At the peculiar posture, the torque generated when the second joint 20 rotates can be suppressed. Since the second joint 20 can be operated with a low load, the behaviors of the second joint 20 and the first arm 110 can be stable, so that the third joint 30 provided at another end of the first arm 110 can also be operated with stability. The acceleration torques required for the motors of the second joint 20 and the third joint 30 can be further suppressed.

Furthermore, the operation according to the example embodiment of the present disclosure can reduce the space (installation space) necessary for installing the articulated robot 100. The target of comparison is the size of an installation space for the articulated robot 100 when the operation of rotating the lumbar portion 10 is performed. Suppose the amount of displacement (displacement) D of the projected point Pr of the second arm reference point from the axis Z1 of the lumbar portion 10 on the horizontal plane in the direction perpendicular to the projected line segment L12.

In the operation according to the example embodiment of the present disclosure, the maximum value of the displacement D is the distance from the contact point S to the projected line segment L12. In contrast, in the "operation of rotating the lumbar portion 10", the maximum value of the displacement D depends on a circular arc drawn on the opposite side of the projected line segment L12. This is obviously larger than the distance from the contact point S to the projected line segment L12. The size of the installation space of the articulated robot 100 depends on the range of motion of the articulated robot 100. Thus, the operation according to the example embodiment of the present disclosure allows the installation space of the articulated robot 100 to be further reduced.

The difference between the control mode according to the forward kinematics and the control mode according to the inverse kinematics will be described subsequently.

Eq. (1) expresses the relationship between the coordinates that define the position and posture of the end of the second arm 120 and six joint variables.

$$x = f_1(\theta_1, \theta_2, \theta_3, \theta_4, \theta_5, \theta_6)$$
$$y = f_2(\theta_1, \theta_2, \theta_3, \theta_4, \theta_5, \theta_6)$$
$$z = f_3(\theta_1, \theta_2, \theta_3, \theta_4, \theta_5, \theta_6)$$
$$\alpha = f_4(\theta_1, \theta_2, \theta_3, \theta_4, \theta_5, \theta_6)$$
$$\beta = f_5(\theta_1, \theta_2, \theta_3, \theta_4, \theta_5, \theta_6)$$
$$\gamma = f_6(\theta_1, \theta_2, \theta_3, \theta_4, \theta_5, \theta_6) \quad (1)$$

The position coordinates in the working space are represented by x, y, and z, and the posture coordinates are represented by α, β, and γ. These coordinate components are the functions (non-linear functions) of the joint variables θ1 to θ6 as expressed as Eq. (1). The six functions are expressed as $f_1$ to $f_6$.

The differentiation of the coordinate components and the differentiation of the joint variables have the linear relationship as expressed by Eq. (2).

$$\begin{bmatrix} dx \\ dy \\ dz \\ d\alpha \\ d\beta \\ d\gamma \end{bmatrix} = \begin{bmatrix} \frac{\partial f_1}{\partial \theta_1} & \cdots & \frac{\partial f_1}{\partial \theta_6} \\ \frac{\partial f_2}{\partial \theta_1} & \cdots & \frac{\partial f_2}{\partial \theta_6} \\ \vdots & & \vdots \\ \frac{\partial f_6}{\partial \theta_1} & \cdots & \frac{\partial f_6}{\partial \theta_6} \end{bmatrix} \begin{bmatrix} d\theta_1 \\ d\theta_2 \\ d\theta_3 \\ d\theta_4 \\ d\theta_5 \\ d\theta_6 \end{bmatrix} \quad (2)$$

The 6-by-6 matrix in Eq. (2) is called a Jacobian matrix (Jacobian). Let Δx be the vector on the left side of the relational expression of Eq. (2), Δθ be the vector on the right side, and J be the Jacobian matrix, as expressed in Eq. (3).

$$\Delta x = \begin{bmatrix} dx \\ dy \\ dz \\ d\alpha \\ d\beta \\ d\gamma \end{bmatrix}, \Delta\theta = \begin{bmatrix} d\theta_1 \\ d\theta_2 \\ d\theta_3 \\ d\theta_4 \\ d\theta_5 \\ d\theta_6 \end{bmatrix}, J = \begin{bmatrix} \frac{\partial f_1}{\partial \theta_1} & \cdots & \frac{\partial f_1}{\partial \theta_6} \\ \frac{\partial f_2}{\partial \theta_1} & \cdots & \frac{\partial f_2}{\partial \theta_6} \\ \vdots & & \vdots \\ \frac{\partial f_6}{\partial \theta_1} & \cdots & \frac{\partial f_6}{\partial \theta_6} \end{bmatrix} \quad (3)$$

The relational expression of Eq. (4) is obtained from Eq. (2). The relational expression of Eq. (5) is obtained from Eq. (4), where $J^{-1}$ is the inverse matrix of the Jacobian matrix J of Eq. (4).

$$\Delta x = J \Delta \theta \quad (4)$$

$$\Delta x = J^{-1} \Delta \theta \quad (5)$$

Δx can be calculated from Δθ using Eq. (4) (forward kinematics calculation). Δθ can be calculated from Δx using Eq. (5) (inverse kinematics calculation). In order to determine the locus of the end of the second arm 120 in the working space and to make the articulated robot execute an operation along the locus, a calculation to calculate Δθ from Δx (inverse kinematics calculation) is needed. However, this calculation needs the inverse ($J^{-1}$) of the Jacobian matrix. Since the Jacobian determinant is zero at the peculiar point, the inverse ($J^{-1}$) of the Jacobian matrix is not present.

In the example embodiment of the present disclosure, when the second arm reference point is at or in the vicinity of the peculiar point, in other words, when the projected point Pr of the second arm reference point is inside the in-position area, control based on the forward kinematics calculation is performed. This allows a pass-through operation in which the peculiar posture is not avoided (FIG. 13) to be executed smoothly.

The above advantageous effects are noticeable as compared with a case in which a workpiece is transported from the initial position to the end position while the lumbar portion 10 is largely rotated to avoid the peculiar posture. In addition, the above advantageous effects are noticeable as compared with a case in which the projected point Pr of the second arm reference point is moved linearly from the projected point P11 to the projected point P22 while the first joint of the lumbar portion 10, the second joint 20, and the third joint 30 are moved in a complicated manner.

FIG. 18 illustrates an example of a horizontal plane projection path Lsb12 (a solid line) through which the articulated robot 100 can be moved more smoothly at higher speed than in the example of FIG. 16. The horizontal plane projection path Lsb12 is a curved line passing through the contact point S in the in-position area, which is the interior of the circle Cy. When the projected point Pr of the second arm reference point reaches the contact point S, the first arm 110 and the second arm 120 become parallel to the axis Z1 of the lumbar portion 10, and the articulated robot 100 takes the peculiar posture, as in the example of FIG. 16.

In order to move the projected point Pr of the second arm reference point along the illustrated curved horizontal plane projection path Lsb12, the controller 200 changes the values of the joint variables of the second joint 20 and the third joint 30 in sequence and also changes the value of the first joint of the lumbar portion 10 in sequence. An example of "in sequence" has been described above.

Since the operation of rotating the lumbar portion 10 is additionally performed, a speed Vr due to the rotation is combined to the speed V of the second arm reference point, with reference to the example of FIG. 16. The speed Vr due to the rotation is obtained as the product of the angular speed of the first joint of the lumbar portion 10 and the length from the center of rotation to the second arm reference point on the horizontal plane. The second arm reference point moves by the sum of the components of the speed V2 due to the rotation of the second joint 20, the speed V3 due to the rotation of the third joint 30, and the speed Vr due to the rotation. Thus, the second arm reference point can move at higher speed than in the example illustrated in FIG. 16.

Figure 19:
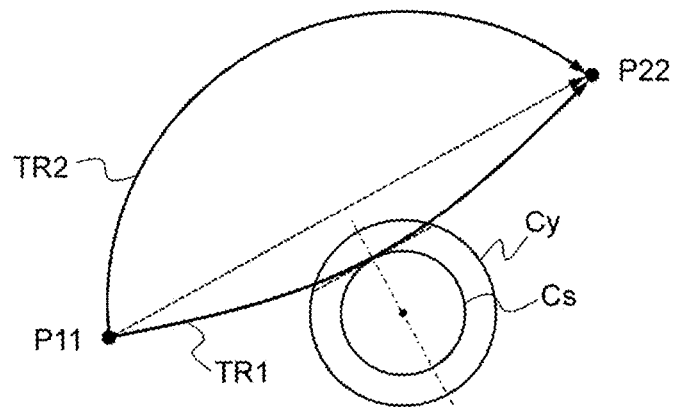
FIG. 19 is a plan view illustrating two horizontal plane projection paths TR1 and TR2 from the projected point P11 to the projected point P22.

Although the path from the projected point P11 to the projected point Ps1 and the path from the projected point Ps2 to the projected point P22 in FIG. 16 are straight, the paths may be curved. Also in FIG. 17, which illustrates FIG. 16 in a three-dimensional manner, although the path from a projected point P11' to a projected point Ps1' and the path from a projected point Ps2' to a projected point P22' are straight, the paths may be curved. Also in the example of FIG. 18, the path from the projected point P11 to a point at which the horizontal plane projection path Lsb12 first intersects the circle Cy, and the path from a point at which the horizontal plane projection path Lsb12 intersects the circle Cy second to the projected point P22 may be straight or curved. The locus of the second arm reference point in the three-dimensional space may be any locus. FIG. 19 illustrates two horizontal plane projection paths TR1 and TR2 from the projected point P11 to the projected point P22. The horizontal plane projection path TR1 is a path through which the workpiece is moved from the projected point P11 of the initial position to the projected point P22 of the end position by switching between the forward kinematics calculation and the inverse kinematics calculation inside and outside the in-position area. In other words, the articulated robot 100 takes the peculiar posture at an intermediate point of the horizontal plane projection path TR1. The horizontal plane projection path TR1 can be the same as the horizontal plane projection path Lsb12 in FIG. 18.

Meanwhile, the horizontal plane projection path TR2 is a path through which the workpiece is moved from the projected point P11 of the initial position to the projected point P22 of the end position by the rotating operation of the lumbar portion 10 of the articulated robot 100. It can be said that the horizontal plane projection path TR2 is a path through which the articulated robot 100 avoids the peculiar posture.

The controller 200 chooses one of the two paths. Examples of the criterion of choice include a user instruction and short required time.

If the criterion of choice is the user instruction, the user specifies the path TR1 for taking the peculiar posture or the path TR2 for avoiding the peculiar posture using an input device (not illustrated), such as a pendant, a keyboard, or a mouse. The controller 200 chooses the path specified by the user and operates according to the path.

If the criterion of choice is the short required time, the controller 200 calculates the time required to move the end of the second arm 120 from the initial position to the end position for each of the paths TR1 and TR2 and chooses a path that takes less time.

Figure 20A:
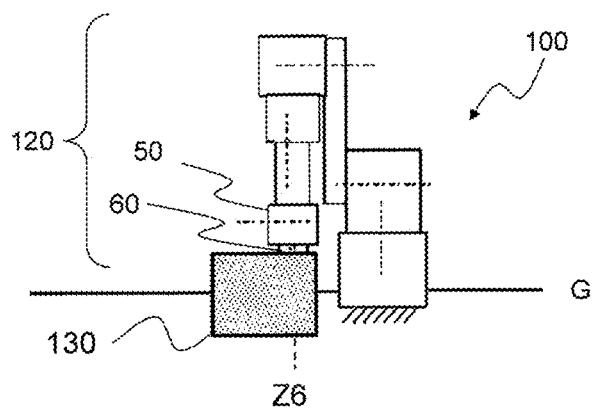
FIG. 20A is a front view of the articulated robot 100 to which an end effector is attached.

FIG. 20A illustrates the articulated robot 100 to which an end effector 130 is attached to the end 122 of the second arm 120. The articulated robot 100 illustrated in FIG. 20A is a robot of the form illustrated in FIGS. 1 and 2.

When the second arm 120 of the articulated robot 100 extends directly below and takes the peculiar posture, the end of the end effector 130 interferes with a floor surface G. For this reason, the controller 200 rotates, for example, the motor of the fifth joint 50, to provide a clearance between the end effector 130 and the floor surface G when taking the peculiar posture.

Figure 20B:
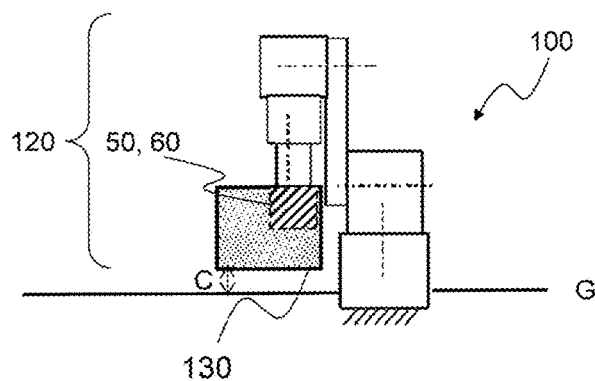
FIG. 20B is a front view of the articulated robot illustrating a posture at which a clearance is ensured between the end effector and the floor surface.

FIG. 20B illustrates the posture of the articulated robot 100 at which the clearance C is ensured between the end effector 130 and the floor surface G. In the example of FIG. 20B, the clearance C is ensured by rotating the motor of the fifth joint 50 to rotate the fifth joint 50 90 degrees to orient the sixth axis Z6 of the sixth joint 60 in a direction perpendicular to the plane of the drawing.

The angle of rotation of the fifth joint 50 can be determined according to parameters such as the shape and size of the end effector 130. The user specifies the parameters using an input device (not illustrated), such as a pendant, a keyboard, or a mouse. Alternatively, the user may import an electronic file storing the parameters to the controller 200.

The controller 200 determines, from the specified parameters, whether the lower end position of the end effector 130 is higher than the level of the floor surface G or the same as or lower than the level in a state in which the end effector 130 is attached to the sixth joint 60 and when the articulated robot 100 takes the peculiar posture. If the lower end position of the end effector 130 is the same or lower than the level of the floor surface G, the controller 200 sets the joint variable $\theta 5$ so as to rotate the fifth joint 50 90 degrees. Thus, the clearance C is ensured when the articulated robot 100 takes the peculiar posture.

If the lower end position of the end effector 130 is equal to or lower than the level of the floor surface G even if the joint variable is set to 90 degrees, the controller 200 can choose not to perform the operation according to the example embodiment of the present disclosure in the state in which the end effector 130 is attached. At that time, the controller 200 may notify the user that the operation for avoiding the peculiar posture is to be performed, using voice, text, warning, flashing light, or the like.

In the case where an end effector 130 whose posture changes is attached to the end 122 of the second arm 120, the parameters of the end effector 130 can include data on the range of motion.

Figure 20C:
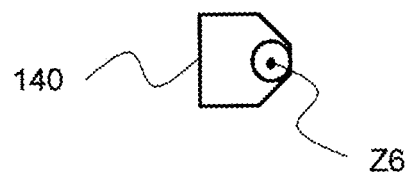
FIG. 20C is a diagram illustrating an example of an end effector that rotates about a sixth axis.
Figure 20D:
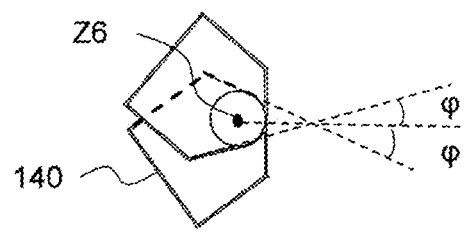
FIG. 20D is a diagram illustrating the range of rotation of the end effector illustrated in FIG. 20C.

FIG. 20C illustrates an example of an end effector 140 that rotates about the sixth axis Z6 of the sixth joint 60. FIG. 20D illustrates the range (angle) φ of rotation of the end effector 140, which is a parameter of the end effector 140, with reference to the position in FIG. 20C.

The controller 200 determines whether the far end of the end effector 140 interferes with the lumbar portion 10 or the first arm 110 when the articulated robot 100 takes the peculiar posture and the end effector 140 is displaced at the maximum possible angle. The far end of the end effector 140 refers to a point or surface furthest to the sixth axis Z6 which is the center of rotation. The far end of the end effector 140 can be determined from the shape and size, which are parameters of the end effector 140. When the far end of the end effector 140 interferes with the lumbar portion 10 and so on, the controller 200 sets the joint variable θ4 so as to rotate, for example, the fourth joint 40 90 degrees to the opposite side from the lumbar portion 10 or the first arm 110. Thus, the clearance C is ensured when the articulated robot 100 takes the peculiar posture.

Figure 21:
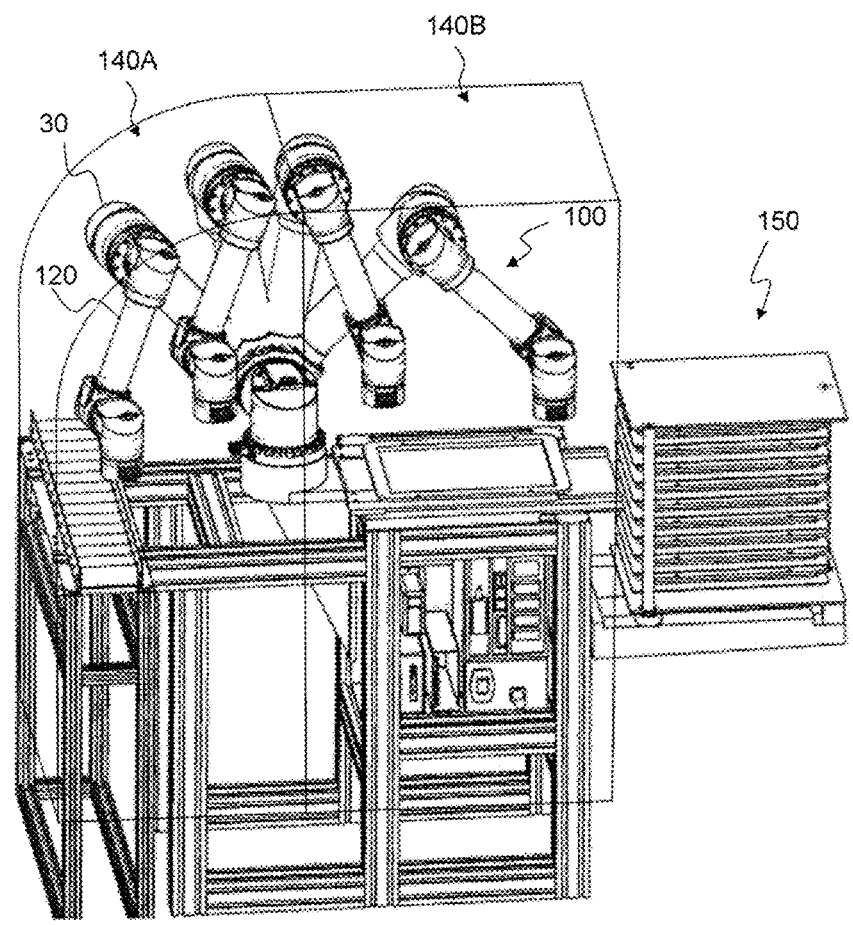
FIG. 21 is a perspective view of an example of a case in which an articulated robot system according to an example embodiment of the present disclosure can be housed.

FIG. 21 is a schematic perspective view of an example embodiment of the articulated robot system according to the present disclosure. FIG. 21 illustrates the postures of the articulated robot 100 at the different four timings illustrated in FIG. 12B at the same time. This is for the purpose of clarifying the range of motion of the articulated robot 100. In the articulated robot system of FIG. 21, a gripper, which is an end effector attached to the end of the second arm 120, grips a workpiece (not illustrated) on a pallet, received from a pallet table and transports the workpiece to the left in the drawing.

The articulated robot system in FIG. 21 is disposed in a case including a first cover 140A having a curved surface and a second cover 140B having a flat surface. Although the first cover 140A and the second cover 140B are described as if they were transparent to illustrate the operation of the articulated robot 100, part or all of these covers may be made of an opaque material.

As apparent from the motion of the second arm 120, the curved surface of the first cover 140A has a shape aligned with part of the locus of the third joint 30 (the arc-shaped locus). This can reduce the clearance from the first cover 140A to the third joint 30 as compared with a case in which the first cover 140A is formed of orthogonal flat surfaces.

Employing such a curved case provides some allowance in space, allowing a display and a scanning panel (not illustrated) to be disposed outside the first cover 140A to effectively use the space.

As can be seen from FIG. 21, the articulated robot 100 of the present disclosure allows a transporting operation in a compact space, which cannot be achieved by a conventional articulated robot.

INDUSTRIAL APPLICABILITY

The articulated robot of the present disclosure can be suitably used in various fields that require transportation of workpieces, component assembly, painting, and other works to be executed in a compact space.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An articulated robot system comprising:
an articulated robot; and
a controller configured or programmed to control the articulated robot; wherein the articulated robot includes:
   a lumbar portion including a first joint that rotates about a first axis which is a vertical axis;
   a second joint connected to the lumbar portion and rotating about a second axis parallel or substantially parallel to a horizontal plane;
   a first arm connected to the second joint and rotating about the second axis;
   a third joint connected to the first arm and rotating about a third axis parallel or substantially parallel to the second axis; and
   a second arm connected to the third joint and rotating about the third axis;
when the first arm extends parallel or substantially parallel to the first axis, a clearance through which the second arm rotating about the third axis can pass in a planar area between the second axis and the third axis is provided between the second arm and the first arm and between the second arm and the lumbar portion;
each of the first joint, the second joint, and the third joint includes a motor electrically connected to the controller;
the controller is configured or programmed to cause the second arm to generate a motion of passing through the planar area by rotating each of the motors;
when moving an end of the second arm from a first position to a second position, the controller is configured or programmed to choose between a first path and a second path based on a criterion, in the first path the second arm takes a peculiar posture when passing through the planar area, and in the second path the second arm avoids the peculiar posture without passing through the planar area.

2. The articulated robot system according to claim 1, wherein the second arm includes:
   a fourth joint that rotates about a fourth axis orthogonal or substantially orthogonal to the third axis; and
   a fifth joint that rotates about a fifth axis orthogonal or substantially orthogonal to the fourth axis.

3. The articulated robot system according to claim 2, wherein the second arm further includes a sixth joint that rotates about a sixth axis orthogonal or substantially orthogonal to the fifth axis.

4. The articulated robot system according to claim 3, wherein
   the fourth and sixth joints are roll joints; and
   the fifth joint is a pitch joint.

5. The articulated robot system according to claim 2, wherein the clearance is provided when joint variables of at least the fourth and the fifth joint have values within a specific predetermined limited range.

6. The articulated robot system according to claim 1, wherein, when a central axis of the second arm is parallel or substantially parallel to the vertical axis, the central axis is offset in a horizontal direction from the vertical axis.

7. The articulated robot system according to claim 1, wherein the lumbar portion is located below the second axis.

8. The articulated robot system according to claim 1, wherein the controller calculates a time required to move an end of the second arm from the first position to the second position for each of the first path and the second path as the criterion and chooses a path of the first path and the second path that takes a shortest time.

9. The articulated robot system according to claim 1, wherein the controller chooses one of the first path and the second path according to an instruction of a user as the criterion.

10. The articulated robot system according to claim 9, wherein the controller:
   chooses an in-position area extending outside the peculiar point locus circle in the horizontal plane;
   segments the horizontal plane projection path of the second arm reference point into an inverse kinematics calculation portion outside the in-position area and a forward kinematics calculation portion inside the in-position area;
   when the projected point of the second arm reference point moves in the inverse kinematics calculation portion, calculates values of joint variables of the first joint and the second joint from coordinates on the horizontal plane projection path by inverse kinematics calculation, and rotates motors of the first joint and the second joint based on the calculated values of the joint variables; and
   when the projected point of the second arm reference point moves in the forward kinematics calculation portion, changes at least the value of the joint variable of the second joint in sequence and rotates the motor of the second joint based on the changed value.

11. The articulated robot system according to claim 10, wherein, when the projected point of the second arm reference point moves in the forward kinematics calculation portion, the controller further changes the value of the joint variable of the first joint in sequence and rotates a motor of the first joint based on the changed value.

12. The articulated robot system according to claim 1, wherein
   when the second arm passes through the planar area to move an end of the second arm from a first position to a second position, assuming that a circle drawn by a projected point obtained by projecting the second arm reference point perpendicularly or substantially perpendicularly to the horizontal plane due to rotation of the lumbar portion at a peculiar posture when the second arm passes through the planar area is a peculiar point locus circle;
   the controller chooses a tangent to the peculiar point locus circle, the tangent being parallel or substantially parallel to a projected line segment obtained by projecting a line segment from the first position to the second position perpendicularly or substantially perpendicularly to the horizontal plane, and chooses, as a horizontal plane projection path of the second arm reference point, a path through which the projected point of the second arm reference point passes a point of intersection of the tangent and the peculiar point locus circle.

13. The articulated robot system according to claim 1, wherein the controller changes a posture of the second arm in accordance with shapes of an end effector and an object being transported so that the end effector and the object being transported do not interfere with the lumbar portion when the second arm passes through the planar area.

14. The articulated robot system according to claim 1, wherein the controller rotates the lumbar portion about the first axis when the second arm passes through the planar area.

15. The articulated robot system according to claim 1, further comprising a cover including a curved surface aligned with at least a portion of a locus of the third joint.

* * * * *